United States Patent [19]

Steinberg

[11] 4,300,601
[45] Nov. 17, 1981

[54] VACUUM VALVE AND MONITORING SYSTEM

[76] Inventor: Hy Steinberg, 7200 NW. 78th St., Tamarac, Fla. 33319

[21] Appl. No.: 95,215

[22] Filed: Nov. 19, 1979

[51] Int. Cl.³ .............................................. B67D 5/32
[52] U.S. Cl. .................................. 141/94; 137/519.5; 200/81 R; 200/277
[58] Field of Search ...................... 141/94, 95, 96, 65, 141/66, 392; 200/81 R, 277; 137/519.5

[56] References Cited

U.S. PATENT DOCUMENTS

| | | | |
|---|---|---|---|
| 1,277,606 | 9/1918 | Kohn | 137/519.5 |
| 1,609,359 | 12/1926 | Humphrey | 137/519.5 |
| 3,661,174 | 5/1972 | Cripe | 137/519.5 |
| 3,823,285 | 7/1974 | Dwyer | 200/277 |

FOREIGN PATENT DOCUMENTS

| | | | |
|---|---|---|---|
| 94611 | 2/1939 | Sweden | 137/519.5 |
| 233675 | 10/1925 | United Kingdom | 137/519.5 |

*Primary Examiner*—Houston S. Bell, Jr.
*Attorney, Agent, or Firm*—Malin & Haley

[57] ABSTRACT

A removable vacuum indicator valve, horizontally affixed to the outside of an evacuated container, such as a flat-plate solar energy collector, wherein a movable sphere inside the valve is positioned to open or close the valve by the force of gravity or atmospheric pressure. The sphere, in open position, indicates the loss of vacuum and completes an electrical circuit which automatically activates a pump for restoring the vacuum to the container. The vacuum indicator valve, in combination with a normally closed valve installed permanently inside the evacuated container, and a remote electrically activated vacuum pumping system, provides a simple, inexpensive method for permanently maintaining and monitoring the vacuum in the container.

5 Claims, 5 Drawing Figures

VACUUM VALVE AND MONITORING SYSTEM

BACKGROUND OF THE INVENTION

This invention relates generally to improvements in the means for monitoring and maintaining a vacuum, or partial vacuum, within relatively large containers, and more particularly to an inexpensive means for permanently maintaining and monitoring evacuated, flat-plate solar collector units.

Until now, there has been no specific need or demand for the use of large, permanently evacuated containers, except within specialized industries and for military and research use. The existing applications generally require accurate pressure measurement devices and precise valving and control systems, and they can justify the large cost involved in the use of standard pressure gauges, valves and monitoring systems now available for the purpose. However, the high cost of such gauges and valve systems precludes their use in any application that requires a simple, non-critical means for permanently maintaining and monitoring a vacuum, as in evacuated solar collector systems. In an evacuated solar collector system, for instance, a loss of vacuum and complete failure of the pumping system would merely reduce the operating efficiency of the collectors, but not prevent their continued operation. A further disadvantage of the standard gauges and valving systems presently available is that they require technical knowledge and skill for proper installation and servicing, making the impractical for applications where laymen might undertake such work, as in an evacuated solar collector system.

SUMMARY OF THE INVENTION

The present invention consists of a simple, inexpensive indicator valve for monitoring the vacuum within an evacuated container, coupled with an automatically controlled means for restoring vacuum losses that occur over a long period of time. This invention is particularly useful for flat-plate solar collector systems employing an evacuated space within the collector units.

In accordance with the present invention, a vacuum indicator valve, consisting of a cylinder with a central, tubular orifice leading to an evacuated space at one end, and to atmospheric pressure at the other end, is removably attached to the side of an evacuated container. The valve is provided with a conical-shaped internal chamber and a movable sphere disposed within the chamber. The sphere, being a closure for the tubular orifice, is normally held in airtight contact with the orifice opening by atmospheric pressure. Upon the loss of vacuum within the container, gravity causes the sphere to move away from the orifice opening and to complete an electrical circuit which activates an automatic pumping system for restoration of the vacuum. The vacuum indicator valve, combined with a normally closed valve within the evacuated container, and the electrically-activated, automatic pumping system, provides a complete and inexpensive means for monitoring and maintaining a permanent, evacuated condition within a large, sealed container.

Accordingly, it is an object of this invention to provide a vacuum valve for applications where a vacuum, or no-vacuum, indicator means can be used instead of pressure differential readings provided by conventional, more expensive pressure gauges.

It is also an object of this invention to provide a vacuum monitoring system that can be installed and serviced at the site of the evacuated container, without special knowledge or skill.

Another object of this invention is to provide a vacuum-maintenance system for non-critical applications that are able to function adequately with a loss of vacuum, until the restoration of vacuum takes place.

Another object of this invention is to provide a vacuum, or no-vacuum indicator means that also acts as a switching device to operate a vacuum pump to restore the vacuum.

A further object of this invention is to make evacuated, flat-plate solar collector systems economically feasible and practical for residential and commercial use.

In accordance with these and other objects which will be apparent hereinafter, the instant invention will now be described with particular reference to the accompanying drawings.

DESCRIPTION OF THE PREFERRED EMBODIMENT

Figure 1:
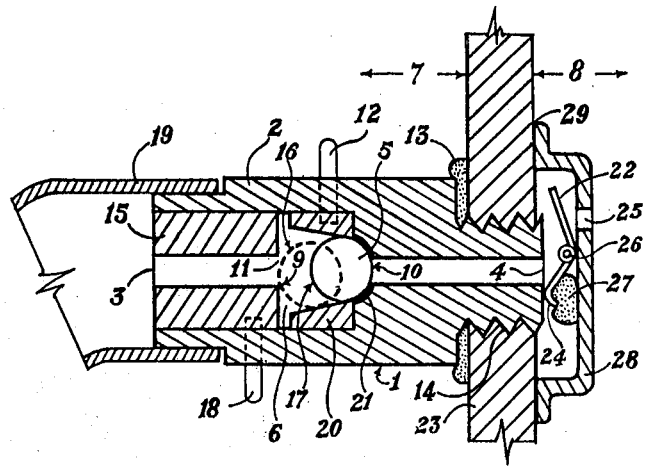
FIG. 1 is a cross-sectional view of the valves embodying the present invention installed horizontally in the side of an evacuated container.
Figure 5:
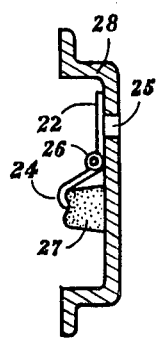
FIG. 5 is a cross-sectional view of a permanently-installed leaf-action valve within the evacuated container, prior to the insertion of the vacuum indicator valve.

Referring now in detail to the drawings, wherein an embodiment of the present invention is shown, and referring particularly to FIG. 1, a vacuum indicator valve, generally designated as numeral 1, is illustrated as being fastened in a horizontal operating position to an evacuated container wall 23 by means of a threaded end 14, with the connection being made airtight by a resilient gasket 13. Within the evacuated flat plate collector frame or container area indicated by numeral 8, a leaf-type valve inside casing 28 is permanently fastened with an airtight adhesive at 29 to the container wall 23. This leaf-type valve, also shown in FIG. 5, is normally closed to prevent loss of vacuum in the container during shipment or installation and during insertion and removal of vacuum indicator valve 1. It also permits a threaded-end vacuum hose, not shown, to be used for evacuation of the container, in the event that the vacuum indicator valve 1 is not being used. The normally-closed position of this leaf-type valve is illustrated in FIG. 5. The leaf 22 is held in mating contact with opening 25, which leads to the evacuated area, by the force of a spring, not shown, at hinge point 26, or by a resilient pad 27 acting upon the leaf extension 24. The leaf 22 may be surfaced with a resilient plastic or rubber material to provide an airtight seal over the opening 25.

Referring again to FIG. 1, upon insertion and seating of the vacuum indicator valve 1 into the container wall 23, the valve leaf 22 is opened by the advancing force of the threaded valve end 14, acting upon the leaf extension 24. As a result, the area of evacuation 8 is extended through the opening 25 and through opening 4 to the surface 10 within the indicator valve 1. The indicator valve 1, being generally of cylindrical shape, has a central, tubular orifice leading into the evacuated container at one end 4 and to the outside atmospheric pressure area indicated by numeral 7 at the other end 3. The tubular orifice, at its mid-section, opens into a centrally located, conical-shaped chamber 6, having an interior surface that converges towards orifice end 4. The walls of chamber 6 may be formed by the insertion of a conical ring 20 and a cylindrical element 15, into the valve body 2. An unattached sphere 5, free to move within the chamber 6, is normally held in airtight, mating contact with the curved chamber surface 21 by atmospheric pressure acting upon sphere surface 17, thereby closing the orifice opening 10. The surface 21 may be covered or lined with a resilient plastic or rubber material to provide an airtight seal. Upon the loss of vacuum in area 8, the pressure differential between the surfaces of the sphere at 10 and 17 is reduced, permitting gravitational force to move the sphere away from its closure position at 10. The sphere then rolls down the inclined surface of ring 20 into position 16, exposing a continuous air-flow path from orifice 3 through the chamber at 11, to the orifice end 4 and into the container through opening 25.

If the valve element 20, ring 15 and sphere 5 are made of electrically-conductive material, such as copper, aluminum or plated steel, the sphere 5 in position 16 will provide an electrical connection between ring 20 and element 15 at resting point 9. Terminals 18 and 12, inserted through valve body 2, into the element 15 and ring 20, respectively, provide an exterior electrical connection for this circuit which may be used to signal the loss of vacuum in the container area 8. The valve elements 20, 15, and 5 are switching elements. An external pair of wires, carrying low-voltage potential, may be connected to terminals 12 and 18, and to a remote control area to activate a pump which will restore the vacuum to the container area 8. The vacuum may be restored through a rigid or flexible hose 19, connected at one end to a shoulder on the valve body 2 and at the other end to the remote area pump.

Figure 2:
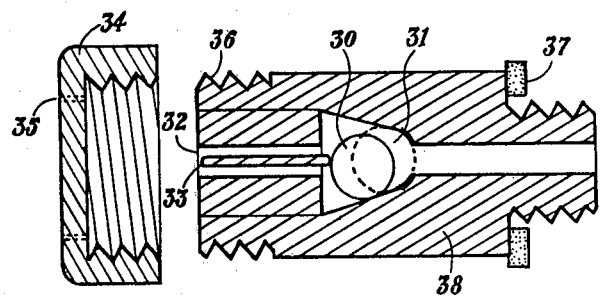
FIG. 2 is a cross-sectional view of a vacuum indicator valve, in its simplest form, as a visual indicator.

Referring now to FIG. 2, in its simplest and most economical form, the valve body 38 may be made of transparent plastic and the sphere 30 may be made of brightly-colored plastic, to provide instant visual confirmation of the sphere position 30 which indicates loss of vacuum. The orifice end 32, leading to the atmosphere, may be protected from the weather with a cap 34 having small-diameter openings 35 to maintain atmospheric pressure at the orifice 32. The orifice 32 may have a flat insert 33 across its diameter and protruding into the valve chamber to prevent the sphere 30 from blocking the orifice opening during the evacuation procedure. Upon the loss of vacuum, the cap 34 may be removed and replaced with a hose leading to the vacuum pump to facilitate the restoration of vacuum. At the end of the evacuation procedure, when atmospheric pressure is restored to the orifice 32 by removal of the vacuum pump hose, the initial rush of air through the orifice 32 will force the sphere into closure position 31, sealing off the evacuated area.

Figure 4:
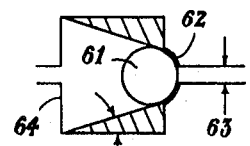
FIG. 4 illustrates some of the factors that affect the design and function of the vacuum indicator valve.

FIG. 4 illustrates some of the valve design variables, such as orifice diameter 63, sphere mating surface 62 material and configuration, sphere 61 weight and composition, incline angle 60 of the chamber wall, and configuration of the chamber wall 64, which may be used to satisfy the different operational requirements of specific vacuum monitoring applications.

Referring back to FIG. 1, wherein all of the parts of the invention are utilized for completely automatic maintenance of a vacuum, the remote area pump connected to hose 19 on valve body 2 might normally remain inactive for many weeks or months at a time, depending on how well the vacuum container has been sealed. Daily, or more frequent operation of the vacuum pump would indicate the need for locating the leak and resealing the container. Where many, separate, evacuated containers are in use, such as a group of flat-plate solar collector units, the electrical terminals 12 and 18, and hose 19 from each indicator valve 1, may be combined to operate from a single control center and pumping system.

Figure 3:
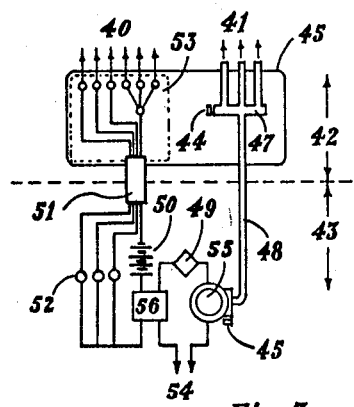
FIG. 3 illustrates a typical electrically-operated pumping system for automatic restoration of loss of vacuum.

FIG. 3 is a generalized diagram of a control center for the operation of a multiple, evacuated container system. The individual hoses 41, leading to the evacuated containers in area 42, may be connected to a manifold 47 inside housing 45, from which a single hose 48 leads to the remote area 43 of the pump 55. Hose 41 may be connected to the device 1 in FIG. 1 as hose 19 is connected. Similarly, the indicator valve wires 40 may be connected to terminals inside a weatherproof terminal box 53. A single, multi-wire cable 51 may carry all of the wires from the terminal box 53 to the remote control area 43. Each of the indicator valves may be connected to its own signal lamp 52 through a lowvoltage source or battery 50, and to a relay 56. The closing of a valve circuit, due to loss of vacuum in any of the containers, would light the corresponding signal lamp 52 and also energize the pump circuit through relay 56. The pump 55, powered by voltage source 54 activated by relay 56, and controlled by timer 49, would restore vacuum to all containers through hose 48. The timer 49 may be set for daytime pumping operation and for a preset pumping time period or cycle, as determined by the evacuated container and hose volumes and the pump capacity. If desired atmospheric pressure may be rapidly restored within the connecting hoses 48 and 41 and 19, at the end of the pumping cycle, by means of a conventional, normally open, electrically operated solenoid valve 44, or any other suitable air valve, installed either on the manifold 47 or on the hose leading out of the pump housing at 45. This instantaneous restoration of atmospheric pressure to the hoses 41 and rush of air into the vacuum indicator valves will cause all valve spheres to return to closed positions and all light signal 52 to be extinguished, thereby indicating that the system is functioning properly and that vacuum has been restored to all containers. During operation of the pump 55, a faulty or non-operative indicator valve on any of the containers would fail to light its corresponding signal lamp 52, prior to the end of the cycle. The vacuum pump 55 may be manually activated periodically, to insure the proper level of evacuation in all containers and to verify that all valves and signal lamps 52 are in working order.

The vacuum pumping and monitoring system described herein may be combined with advanced microcircuitry controls for greater flexibility or economy of operation. Furthermore, the indicator valves and pumping system may be used for other and additional applications that might benefit from the evacuated-container type of insulation on their outer surfaces, such as hot water storage tanks, refrigeration units and other large appliances that operate at temperatures above or below their surrounding temperature. These new applications would require only the addition of a hose and electrical connection to an existing vacuum monitoring and pumping system.

It should be noted that this system is of particular use in an evacuated, flat-plate solar collector that includes an airtight outer frame defining an opening in which an essentially flat, black collector plate is disposed within the frame, a means for collecting heat connected to the collector plate, at least one transparent plate positioned above the collector plate for admitting solar radiation to the collector plate wherein it is converted to useable heat energy, and a back cover plate positioned below the collector plate for retaining an insulation means.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In an evacuated, flat-plate solar collector, including an airtight outer frame wherein a space within the frame is substantially evacuated, the improvement for preventing the loss of vacuum within said space which permits the evacuation of said space, in the event of loss of vacuum, comprising:

a non-automatic valve, permanently attached to said frame by an airtight means, covering an exterior opening in said frame, said valve including a movable cover normally closing the aperture into the evacuated space, said cover being openable by the insertion of a suitably configured evacuating device.

2. An evacuated flat-plate solar collector as set forth in claim 1, wherein:

said device is a vacuum-indicating sensor.

3. In an evacuated flat-plate solar collector, including an airtight outer frame wherein a space within the frame is substantially evacuated, the improvement for indicating the loss of vacuum within such space, comprising:

a valve attachable to the outside of the evacuated frame in an airtight manner and positionable in a generally horizontal position, said valve having an outer, non-porous body with a central orifice leading from an internal chamber to the evacuated frame and said chamber leading externally to atmospheric pressure, said orifice having a distal end connectable to the evacuated frame, said chamber having at least one wall converging towards said orifice, said valve including an unattached sphere within said chamber, said sphere being a closure for said orifice and positionable in airtight contact with said orifice by force of atmospheric pressure, said sphere being free to be released from said orifice by gravitational force, said sphere movable along the incline of said chamber wall upon the loss of vacuum in said orifice, and wherein said outer body of said valve is a transparent plastic material.

4. In an evacuated, flat-plate solar collector, including an airtight outer frame wherein a space within the frame is substantially evacuated, the improvement for preventing the loss of vacuum within said space which permits the evacuation of said space, in the event of loss of vacuum, comprising:

a vacuum monitoring and pumping system;

a pressure-indicating, electrically-operated sensor connected to said frame and said vacuum monitoring and pumping system;

an airtight hose connected at one end to said frame and at the other end connected to said vacuum monitoring and pumping system whereby said system is activated by said sensor to evacuate said frame upon the loss of vacuum within said frame.

5. An evacuated flat-plate solar collector as set forth in claim 4, wherein said pressure-indicating, electrically-operated sensor connected to said frame and said vacuum monitoring and pumping system comprises:

a valve attached to said frame in an airtight manner and positionable in a generally horizontal position, said valve having an outer, non-porous body with a central orifice leading from an internal chamber to the evacuated frame and said chamber leading externally to atmospheric pressure, said orifice having a distal end connected to the evacuated frame, said chamber having at least one wall converging towards said orifice, said valve including an unattached sphere within said chamber, said sphere being a closure for said orifice and positionable in airtight contact with said orifice by force of atmospheric pressure, said sphere being free to be released from said orifice by gravitational force, said sphere movable along the incline of said chamber wall upon the loss of vacuum in said orifice, said sphere being composed of an electrically-conductive material and said chamber being composed of two, separated, electrically-conductive materials, each being connected to a terminal external of said outer body, and whereby the movement of said sphere away from said orifice completes an electrical circuit between said electrically-conductive chamber materials.

* * * * *